United States Patent
Morrill

[15] 3,653,448
[45] Apr. 4, 1972

[54] SOD HARVESTING VEHICLE

[72] Inventor: Donald W. Morrill, Hanna, Ind.

[73] Assignee: Big J. Products, Inc., Hanna, Ind.

[22] Filed: Feb. 6, 1970

[21] Appl. No.: 9,237

[52] U.S. Cl.....................172/19, 172/438, 107/9, 172/669
[51] Int. Cl. ......................................................A01b 45/04
[58] Field of Search ..................172/19, 20, 1; 214/519, 83.1; 56/35

[56] References Cited

UNITED STATES PATENTS

| | | | |
|---|---|---|---|
| 3,499,492 | 3/1970 | Daymon | 172/19 |
| 3,509,944 | 5/1970 | Brower et al. | 172/20 |
| 2,861,703 | 11/1958 | Imazimi et al. | 214/83.1 |
| 3,483,686 | 12/1969 | Long et al. | 56/35 |
| 2,358,000 | 9/1944 | Cornell | 172/20 |
| 3,519,082 | 7/1970 | Miner | 172/20 X |
| 3,053,328 | 9/1962 | Geipel | 172/19 |
| 3,164,211 | 1/1965 | Scott | 172/19 |

Primary Examiner—Robert E. Pulfrey
Assistant Examiner—Stephen C. Pellegrino
Attorney—Prangley, Clayton, Mullin, Dithmar & Vogel

[57] ABSTRACT

A sod harvesting vehicle having means at the forward end for simultaneously rolling pre-cut sod into rolls and elevating same from the ground, a transverse conveyor adapted to transport sod rolls laterally from the rolling and elevating means, a longitudinal conveyor in effective relation with the transverse conveyor for transporting sod rolls longitudinally to the rear of the vehicle and a platform for personnel and pallet handling means at the rear of the vehicle. In preferred form, the vehicle has two sod rolling and elevating means, one on each forward side of the vehicle, two transverse conveyors and two pallet handling means, one on each rearward side of the vehicle. The two rolling and elevating means enable the vehicle to harvest sod back and forth continuously along the same edge of a sod field, thereby avoiding non-productive trips back to the beginning end of the field, and the two pallet handling means enable operators to load two pallets with rolled sod more or less simultaneously, thereby keeping pace with the high production capability of each rolling and elevating means.

4 Claims, 6 Drawing Figures

Patented April 4, 1972

Inventor
DONALD W. MORRILL
BY
Prangley, Clayton, Mullin,
Dithmar & Vogel
ATTYS.

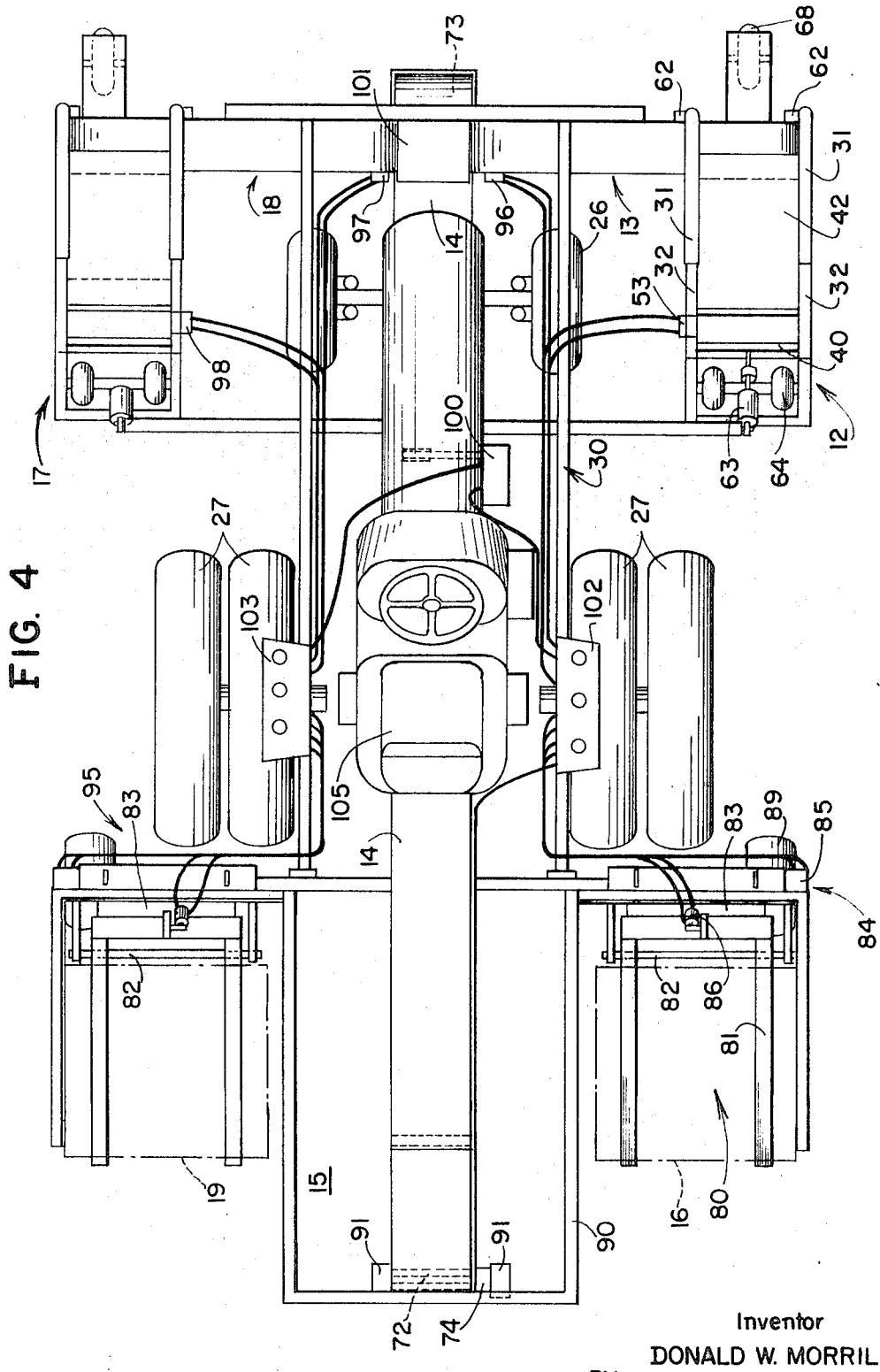

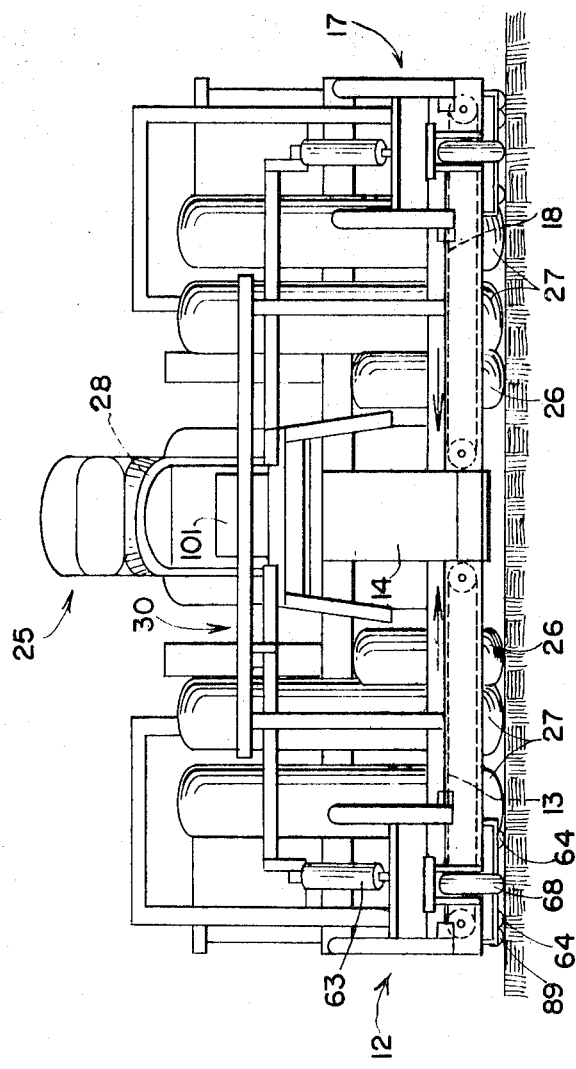
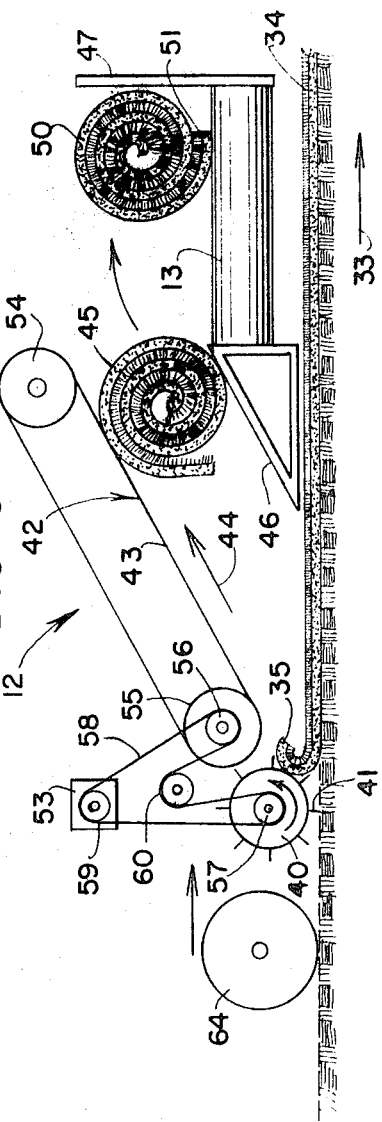

3,653,448

SOD HARVESTING VEHICLE

BACKGROUND OF THE INVENTION

This invention relates to apparatus for harvesting pre-cut sod, and more particularly to a vehicle which travels along an edge of a sod field and forms the sod into rather tightly wound rolls, and elevates and transports the rolls to a location on the vehicle where they conveniently may be loaded on one or more pallets.

One of the most important characteristics of sod harvesting apparatus is production rate. Inasmuch as sod desirably should be delivered to a customer within 3 or 4 hours after cutting, the importance of a high production rate is manifest.

Another feature of importance is the amount of man power required for operating the apparatus. Required man power should be minimized, and this is achieved in part through a high rate of production. The vehicle of the invention, as will be seen, is capable of an extremely high production rate, and the arrangement of the vehicle is such that the workers are utilized continuously during vehicle operation.

Prior art sod harvesting apparatus is shown in U.S. Pat. Nos. 3,053,328 and 3,164,211. As far as is known, the apparatus shown in these patents for one reason or another has not been successful commercially.

The sod harvesting vehicle disclosed and claimed herein has been constructed and tested extensively. It has operated successfully, and plans have been made for commercial manufacture and sale.

SUMMARY OF THE INVENTION

The invention comprises a wheeled vehicle, such as a more or less conventional "high" tractor, means at the forward end of the vehicle for simultaneously rolling pre-cut sod into rolls as the vehicle moves along an edge of a sod bed and elevating the rolls from the ground, a transverse conveyor in effective relation with the sod rolling and elevating means to transport sod rolls laterally, and a longitudinal conveyor for transporting sod rolls longitudinally to the rear of the vehicle.

A platform for operating personnel and pallet handling means are located at the rear of the vehicle in effective relation with the longitudinal conveyor. The pallet handling means may be more or less conventional, including a fork lift for a pallet, the lift effective to vary the pallet elevation during the course of loading the pallet manually with sod rolls. When a pallet is filled, the fork lift mechanism is tilted to allow the pallet to slide to the ground, after which the loaded pallet quickly may be transferred to a truck for timely delivery to a customer.

In preferred form the vehicle of the invention has two means for rolling pre-cut sod into rolls and elevating same from the ground, one at each lateral forward part of the vehicle. Each rolling and elevating means has an associated transverse conveyor which transports elevated sod rolls laterally to the center of the vehicle. The longitudinal conveyor extends centrally of the vehicle below the motor which drives the vehicle and the seat of the vehicle operator, and terminates in the rear portion of the vehicle above a stationary platform provided for operators who manually transfer the sod rolls from the conveyor to both of two pallets carried by duplicate pallet handling means at the rear of the vehicle.

The production rate of each sod rolling and elevating means is so high that two sod roll handling operators will be kept fully busy loading the two pallets, thereby insuring efficient use of both man power and vehicle.

Further efficiency is achieved through the provision of the two sod rolling and elevating means, one on each side of the vehicle. With this arrangement, the vehicle may travel back and forth along the same edge of a sod field and engage in a harvesting operation with each travel run. Absent the second rolling and elevating means, the vehicle, as in the case of some prior art apparatus, would have to travel the length of the field in a non-productive run in order to start each productive run from the same end of the field.

While it is possible to use a uni-directional vehicle along two opposite edges of a sod field, thereby eliminating the aforesaid non-productive run, this procedure is objectionable because of waste experienced due to the triangular or irregular shape of the sod harvested from the central part of the field during the last one or two runs. Sod of irregular shape is unacceptable commercially.

The productive capacity of a sod harvesting vehicle constructed in accordance with the invention is of the order of 2,300 square yards per hour, and maximum utilization is made of the required man power. The area of sod in a commercial sod roll normally is 1 square yard, the usual dimensions thereof being 1½ feet wide and 6 feet long, although the dimensions are subject to variation.

The vehicle of the invention contains adjustments which cooperate to provide rolls of sod having predetermined area, regardless of sod and soil type. Such adjustments compensate for sod strips of different lengths and widths.

Other objects, advantages and features of the invention will be apparent as the description proceeds, reference being had to the accompanying drawings wherein a preferred form of the invention is shown. It will be understood that the description and drawings are illustrative only, and that the scope of the invention is to be measured by the appended claims.

BRIEF DESCRIPTION OF THE DRAWINGS

FIG. 4 is a top plan view of a vehicle embodying the invention in preferred form.

FIG. 5 is a front view of the vehicle shown in FIG. 4.

FIG. 6 is an enlarged diagrammatic elevational view of one form of sod rolling and elevating means usable in the invention.

DESCRIPTION OF THE PREFERRED EMBODIMENT

Figure 1:
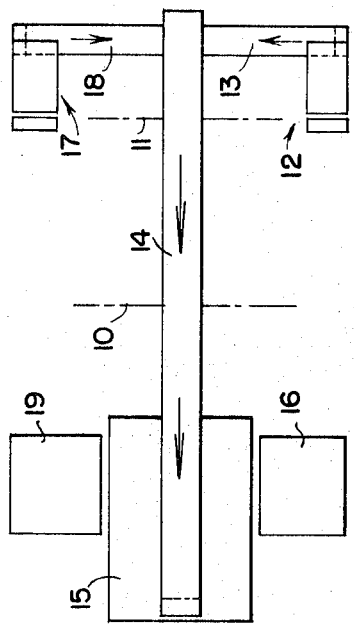
FIG. 1 is a diagrammatic plan view of the main functional components of a sod harvesting vehicle embodying a preferred form of the invention.

The over-all structure and operation of a vehicle embodying the invention readily may be understood from the diagrammatic showing in FIG. 1, a top plan view of the main functional components of the vehicle. These components perform sod rolling, elevating, transporting and pallet handling functions. The tractor per se is omitted in this figure for clarity, the spacing between broken lines 10 (axis of rear wheels) and 11 (axis of front wheels) serving to indicate the wheelbase of the tractor.

Means for rolling pre-cut sod into rolls and elevating the rolls from the ground is generally designated 12, while 13 designates a transverse conveyor in effective relation with means 12. Conveyor 13 receives successive sod rolls from means 12 at the forward end of the vehicle and transports them transversely to the center of the vehicle and deposits them on longitudinal conveyor 14 which in turn transports them from the front to the rear of the vehicle.

A platform 15 is mounted at the rear of the vehicle below conveyor 14, which platform is occupied by one or more workers during sod harvesting operations of the vehicle. A pallet 16 for receiving sod rolls is mounted adjacent platform 15 in convenient position for a worker standing on platform 15. Pallet 16 is supported on pallet handling means (not shown in FIG. 1) which later will be described. The pallet handling means functions to lower the elevation of the pallet as the pallet is being loaded manually by a worker, and to discharge a fully loaded pallet to the ground.

The preferred form of the invention shown in FIG. 1 also includes a sod rolling and elevating means 17 on the side of the vehicle opposite means 12, a transverse conveyor 18 which, like conveyor 13, also feeds longitudinal conveyor 14, and a second pallet 19 and associated pallet handling means at the rear on the side of the vehicle opposite pallet 16.

Figure 2:
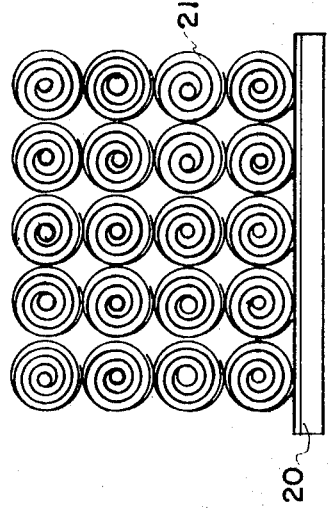
FIG. 2 is an elevational view of a pallet loaded with sod rolls harvested by the vehicle and placed manually on the pallet during operation of the vehicle.

A pallet 20 loaded with sod rolls 21 is shown in FIG. 2, the pallet carrying by way of example some 20 sod rolls each containing a square yard of sod. As previously mentioned, a typical roll may have a width of 1½ feet, with the sod strip having a length of 6 feet.

Figure 3:
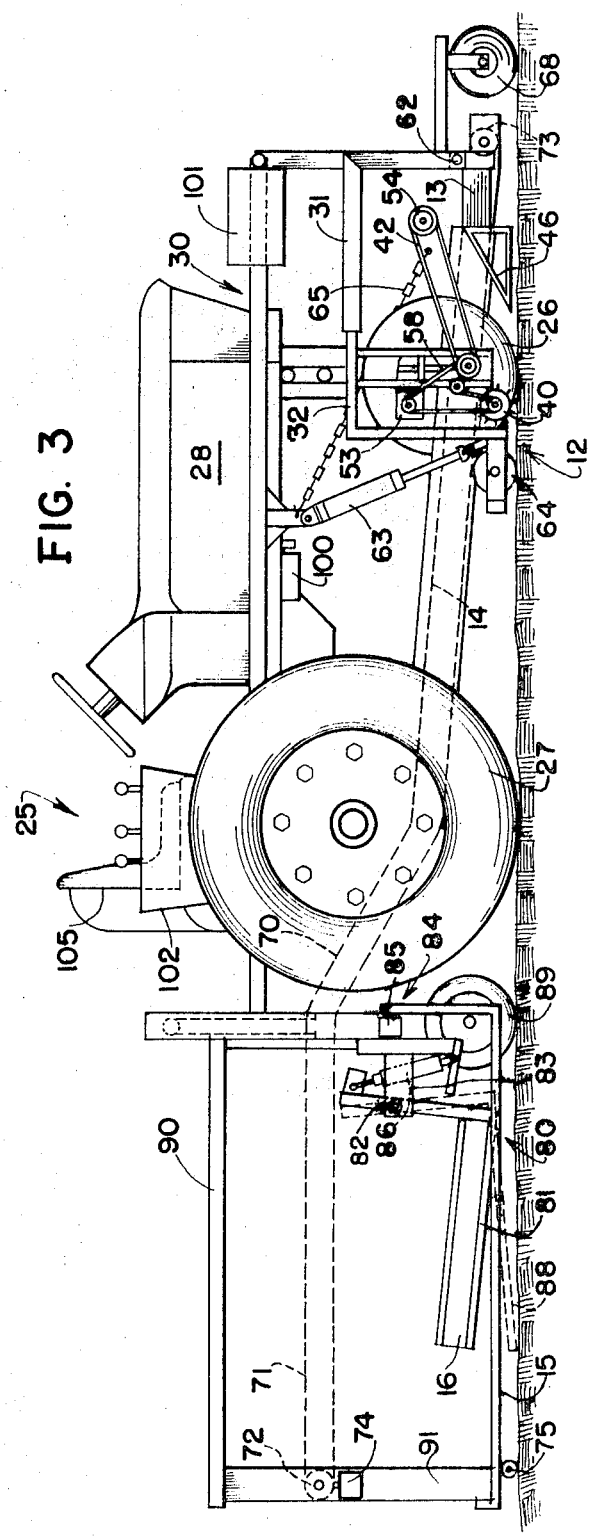
FIG. 3 is a side elevational view of a sod harvesting vehicle embodying the invention.

Referring now to FIG. 3, a vehicle embodying the invention includes a "high" tractor 25 having front and rear wheels 26 and 27. Tractor 25 has a motor means generally designated 28 which in a "high" tractor is mounted a substantial distance above the ground. Motor means 28 is connected to rear wheels 27 through a suitable transmission (not shown).

Motor means 28, as shown in the illustrated embodiment, functions only to drive tractor 25, and auxiliary motor means such as separate hydraulic motors are provided to drive the other components of the vehicle such as the sod rolling and elevating means 12 and 17, the conveyors 13, 14 and 18 and the aforesaid pallet handling means which move the pallets to convenient levels of elevation. However, it is within the contemplation of the invention to power these various other components from motor means 28, if desired, and thereby eliminate the separate auxiliary motor means.

Still referring to FIG. 3, tractor 25 has a frame generally designated 30 which serves to support the aforesaid various other components of the sod harvesting vehicle.

Sod rolling and elevating means 12 (lower right in FIG. 3) is suitably mounted on frame 30. Means 12 includes two pairs of frame members 31 and 32, best shown in FIG. 4, which telescope each other so each combined frame member 31, 32 is adjustable as to length. This is one of the adjustments previously referred to which is made to condition the apparatus for harvesting sod strips of different lengths.

Details of the illustrated sod rolling and elevating means 12 are shown diagrammatically in enlarged FIG. 6. The arrangement there shown is a preferred one for use in the vehicle of the invention.

Referring to FIG. 6, sod rolling and elevating means 12 travels in the direction of arrow 33 during the operation of harvesting a strip 34 of pre-cut sod. End 35 of pre-cut sod strip 34 first is engaged by a drum 40 which rotates in counterclockwise direction as indicated by the arrow thereon. Drum 40 has a plurality of circumferentially spaced longitudinally extending blade means 41 or equivalent which engage sod end 35 and initiate the sod rolling operation.

As the vehicle travels to the right, the sod rolling operation continues, and presently the roll has sufficient diameter and proper relative position to engage an endless rolling mat 42 (FIG. 6), the lower course 43 of which travels in the direction indicated by arrow 44. Lower course 43 of mat 42 bears on the top of the partly coiled roll and cooperates to fully coil the roll, producing a sod roll 45.

It will be understood, of course, that as the vehicle moves to the right and mat 42 functions to coil the roll, the diameter of the roll continues to increase. As the coiling approaches completion, mat 42 moves roll 45 into engagement with inclined elevating member 46 which is a part of rolling and elevating means 12. Roll 45 is caused to travel up inclined member 46 as shown in FIG. 6 and be deposited on transverse conveyor 13. A stop wall 47 extending along the forward longitudinal side of conveyor 13 serves to retain a sod roll in proper position on transverse conveyor 13.

A preceding sod roll 50 is shown on conveyor 13 resting against stop wall 47, and it will be noted that exterior end 51 of the sod roll is at the bottom. This is desirable from the standpoint of maintaining the integrity of the roll, and proper adjustment of the telescoping frame members 31 and 32 helps to insure uniformity in this respect.

Concluding the description of the sod rolling and elevating means 12 shown in FIG. 6, drum 40 and endless rolling mat 42 are suitably driven as by a motor means 53 which may be a hydraulic motor. Rolling mat 42 travels around drums 54 and 55, the latter having an associated drive wheel 56. Drum 40 has a drive wheel 57. A chain or belt 58 extends around a drive wheel 59 on motor means 53, drive wheel 56, drive wheel 57 and an idler wheel 60.

Referring again to FIG. 3, sod rolling and elevating means 12 is pivoted at its forward end to frame 30 at 62, and a hydraulic cylinder 63, connected at one end to frame 30 and at the other end to means 12, is provided for raising means 12 to inoperative position and lowering same to operative position. Wheels 64 (FIGS. 3, 4, 5 and 6) engage the ground when means 12 is in operative position.

Drum 54 at the upper right hand end of endless rolling mat 42, best shown in FIG. 6, is supported by struts (not shown) having pivotal relation with the axis of lower drum 55. With this arrangement, rolling mat 42 is permitted to "float" up and down and thereby be self-adjusting to the increasing diameter of sod roll 45 during the rolling operation. A chain 65 (FIG. 3) connected between frame 30 and the pivoted struts for drum 54 maintains rolling mat 42 in suitable spaced relation with inclined elevating device 46.

A wheel 68 (FIGS. 3, 4 and 5) is suitably mounted forwardly of frame 30 to provide additional stability and support at the forward end of the vehicle, particularly for sod rolling and elevating means 12.

Still referring to FIG. 3, longitudinal conveyor 14 extends from the inner end of transverse conveyor 13 centrally of the vehicle below motor means 28 and the axis of rear tractor wheels 27. From the position below the axis of wheels 27 conveyor 14 inclines upwardly as shown at 70, and at the rear of tractor 25 angles so as to extend horizontally as shown at 71.

Conveyor 14, as shown, is an endless belt, the rearward end of which is carried on roller 72 and the forward end of which is carried on roller 73. Intermediate idler rollers (not shown), of course, are provided at the aforesaid positions where conveyor 14 changes direction. Rear conveyor roller 72 is suitably mounted in frame 30, and, as shown, an auxiliary motor means 74, also mounted on frame 30, is provided to rotate roller 72.

Previously mentioned platform 15 is mounted on frame 30, and is located close to the ground. Small wheels 75 (FIG. 3) on platform 15 engage the ground and serve to support the rearward end of the platform. As previously mentioned, one or more workers stand on platform 15 during a sod harvesting operation.

Pallet 16 is carried on pallet handling means generally designated 80 which may include a more or less conventional fork 81 pivoted at 82 (FIG. 3) to a bracket member 83. An elevator mechanism 84 supports bracket member 83, and functions to move fork 81 and supported pallet 16 to desired elevation in keeping with the manual loading of pallet 16 with sod rolls from conveyor 14.

A motor means 85 (FIG. 3) such as a hydraulic motor actuates elevator mechanism 84, and a hydraulic cylinder 86 connected between bracket 83 and fork 81 functions to tilt fork 81 back and forth on pivot 82. When fork 81 is in elevated positions for supporting pallet 16 at desired levels for loading, hydraulic cylinder 86 maintains fork 81 in the tilted position shown in FIG. 3, and when elevator mechanism 84 lowers fork 81 to pallet-discharging position, cylinder 86 tilts fork 81 to the dotted line position indicated by 88 so pallet 16 may slide to the ground.

A wheel 89 mounted on frame 30 below elevator mechanism 84 aids in supporting pallet handling device 80 and stabilizes the vehicle.

A horizontal railing 90 (FIGS. 3 and 4) forming part of frame 30 may be provided above platform 15, the rear of the railing being connected to platform 15 by vertical members 91. The aforesaid rear conveyor roller 72 and motor means 73 for the roller may be mounted on members 91.

Elevator mechanism 84 is adapted to lift fork 81 and pallet 16 thereon through a vertical distance, for example, of about three feet. Thus, pallet 16 may at all times have an elevation which is convenient for the efficient manual transfer of sod rolls from longitudinal conveyor 14 to pallet 16, or to the upper surface of rolls already loaded on pallet 16. As will be understood, pallet 16 is at an upper level at the start of a loading operation and is gradually lowered as loading progresses. When loading is completed, pallet 16 is at lowermost position, ready to be tilted, as aforesaid, and slid from fork 81 to the ground.

Thereafter, an empty pallet 16 is positioned on fork 81, and elevated to initiate a subsequent pallet-loading operation.

Referring to FIG. 4, the various duplicate components used in the preferred embodiment of the invention are shown, including second sod rolling and elevating means 17, second transverse conveyor 18 and a second pallet handling means 95. Platform 15 underlies both sides of longitudinal conveyor 14 so that workers may stand in effective position between conveyor 14 and pallets 16 and 19 on opposite sides of the conveyor.

Still referring to FIG. 4, transverse conveyors 13 and 18 are powered by motor means 96 and 97 which may be hydraulic motors suitably mounted in frame 30. Second sod rolling and elevating means 17 is powered by motor means 98 which likewise may be a hydraulic motor. A hydraulic pump 100 suitably connected to a centrally located reservoir 101 drives the respective hydraulic motor means in response to controls 102 (right side) and 103 (left side) located adjacent seat 105 for the tractor operator. The hydraulic system may be conventional.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. A sod harvesting vehicle comprising:
 a frame adapted to move over the ground;
 wheels on said frame;
 means for rolling pre-cut sod into rolls and elevating same from the ground, said means mounted on one lateral forward part of said frame;
 a transverse conveyor on a forward part of said frame in effective relation with said sod rolling and elevating means and adapted to transport sod rolls laterally from said means toward the transverse center of said frame;
 a longitudinal conveyor on and centrally of said frame in effective relation with said transverse conveyor and adapted to transport sod rolls longitudinally to the rear of said frame;
 a platform on said frame below and laterally of the rear portion of said longitudinal conveyor; and
 a pallet handling means on said frame adjacent said platform on the lateral rearward part of said frame in general alignment with said sod rolling and elevating means,
 whereby a worker on said platform conveniently may move sod rolls manually from said longitudinal conveyor to a pallet on said pallet handling means.

2. The combination of claim 1 with the addition of a second means for rolling pre-cut sod into rolls and elevating same from the ground, said second means mounted on the other lateral forward part of said frame, a second transverse conveyor on the forward part of said frame in effective relation with said second sod rolling and elevating means and adapted to transport sod rolls from said second sod rolling and elevating means laterally to said longitudinal conveyor and a second pallet handling means on said frame adjacent said platform, said second pallet handling means on the other side of said conveyor.

3. The combination of claim 2 with the addition of motor means mounted on said frame, said motor means in driving relation with at least one of said wheels, said sod rolling and elevating means, said conveyors and said pallet handling means.

4. The combination of claim 3 wherein said longitudinal conveyor extends below the motor means which is in driving relation with at least one of said wheels.

* * * * *